(12) United States Patent
Kunnathur Ragupathi et al.

(10) Patent No.: US 10,514,741 B2
(45) Date of Patent: Dec. 24, 2019

(54) SERVER INFORMATION HANDLING SYSTEM INDICATOR LIGHT MANAGEMENT

(71) Applicant: Dell Products L.P., Round Rock, TX (US)

(72) Inventors: Dinesh Kunnathur Ragupathi, Round Rock, TX (US); Alaric J. N. Silveira, Austin, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 15/647,616

(22) Filed: Jul. 12, 2017

(65) Prior Publication Data

US 2017/0308143 A1    Oct. 26, 2017

Related U.S. Application Data

(62) Division of application No. 14/524,270, filed on Oct. 27, 2014, now Pat. No. 9,720,479.

(51) Int. Cl.
*G06F 1/32* (2019.01)
*G06F 1/26* (2006.01)
*G06F 1/3203* (2019.01)

(52) U.S. Cl.
CPC ............ *G06F 1/3203* (2013.01); *G06F 1/32* (2013.01); *G06F 1/26* (2013.01)

(58) Field of Classification Search
CPC .................................. G06F 1/26; G06F 1/32
See application file for complete search history.

(56) References Cited

U.S. PATENT DOCUMENTS

| 8,729,834 | B1 | 5/2014 | Funderburk et al. | |
|---|---|---|---|---|
| 8,738,158 | B2* | 5/2014 | Sims | H05B 37/029 700/108 |
| 2004/0212511 | A1 | 10/2004 | Ahrens et al. | |
| 2005/0248299 | A1* | 11/2005 | Chemel | H05B 37/029 315/312 |
| 2007/0050644 | A1* | 3/2007 | Merkin | G06F 1/206 713/300 |
| 2007/0233854 | A1* | 10/2007 | Bukovec | H04L 43/045 709/224 |
| 2008/0068199 | A1* | 3/2008 | Franz | G06F 1/181 340/815.45 |
| 2008/0218334 | A1* | 9/2008 | Pitchers | H04L 41/0893 340/539.1 |
| 2009/0218951 | A1* | 9/2009 | Weaver | H05B 37/0272 315/154 |

(Continued)

*Primary Examiner* — Phil K Nguyen
(74) *Attorney, Agent, or Firm* — Zagorin Cave LLP; Robert W. Holland

(57) ABSTRACT

Server information handling system LED indication lights and other illumination devices are selectively illuminated based upon override configuration settings pushed down from a data center administrative tool. A chassis management controller that manages a blade or rack with plural server information handling systems overrides indication light illumination at blade or rack components, such as power supply and I/O modules. Power saved by reducing indication light illumination is allocated to support operation of one or more server information handling systems.

9 Claims, 5 Drawing Sheets

(56) References Cited

U.S. PATENT DOCUMENTS

| | | | |
|---|---|---|---|
| 2010/0079302 A1* | 4/2010 | Eide | G06F 9/5077 340/691.8 |
| 2012/0280565 A1* | 11/2012 | Logvinov | H05B 37/0254 307/31 |
| 2014/0055240 A1* | 2/2014 | Couvee | G06F 11/324 340/6.1 |
| 2014/0211984 A1* | 7/2014 | Calio | G06Q 10/087 382/103 |
| 2015/0131270 A1* | 5/2015 | Geisler | H05K 7/1485 362/133 |
| 2015/0185119 A1 | 7/2015 | Nagai et al. | |

* cited by examiner

| Create Policy | | | | |
|---|---|---|---|---|
| Policy Name | _____ | | | |
| Inputs | ☐ BEZEL | ☐ HEALTH | | |
| Profiles | ☐ FONT | ☐ REAR | ☐ CUSTOM | |
| Lights | ☐ OFF | ☐ ON | ☐ BLINK | |
| Color | ☐ NORMAL | ☐ AMBER | | |

SERVER INFORMATION HANDLING SYSTEM INDICATOR LIGHT MANAGEMENT

BACKGROUND OF THE INVENTION

Field of the Invention

The present invention relates in general to the field of server information handling system power management, and more particularly to server information handling system indicator light management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems provide the information backbone for many enterprises. For example, server information handling systems provide centralized communications for enterprise employees to share email and documents by interfacing through client information handling systems. Server information handling systems perform enterprise data storage management by interfacing client information handling system with data storage locations, such as storage area networks (SANs). Server information handling systems often provide a primary enterprise interface with customers for purchasing products and/or services and supporting sales. In order to perform information management in a reliable manner, enterprises often use large numbers of server information handling systems deployed across multiple locations that interface with client information handling systems through the Internet. In some instances, enterprises will own and operate their own data centers with each data center supporting multiple racks of server information handling systems, each rack having multiple server information handling systems. In other instances, enterprises will "rent" space in data centers that support server information handling systems of the enterprise, or will "rent" the use of information handling systems owned by data centers, such as by operating virtual machines that run over physical information handling systems maintained by the data centers.

Data centers that support server information handling systems often include expensive specialized equipment in order to provide an adequate environment for the server information handling systems to run. For instance, data centers typically include substantial HVAC equipment to ensure an adequate flow of cooling airflow to the server information handling systems. As another example, data centers typically have advanced power supply infrastructures to ensure that information handling systems have reliable power for operating electronic equipment that is sensitive to power fluctuations. A typical data center will include rows of racks or blade chassis that each support multiple server information handling systems, with each rack or chassis aligned to receive cooling and power resources. Generally, cooling and power resources are allocated by a data center administrator that communicates with rack or blade chassis management controllers (CMCs). In turn, the CMCs allocate cooling and power resources to individual server information handling systems through each server information handling system's baseboard management controller (BMC). Administrators allocate cooling and power resources based upon the availability of such resources and the priority of particular server information handling systems or the functions they support.

Although information handling systems generally provide reliable service, large data centers do typically have continuing maintenance needs. Individual components within an information handling system that fail are generally replaced or otherwise repaired by technicians who are assigned to perform repairs by an administrators. In some instances, administrators detect component failures with communications sent through management networks by BMCs and CMCs. In other instances, technicians walk the data center rows and address repair issues as they arise. In both instances, technicians often rely upon visual indications of server information handling system health and operations. One common visual indication is a set of one or more LEDs that illuminate under the control of the BMC to indicate the operational status of the server information handling system and its components. Often, green and amber LEDs are included with the green LEDs indicating a healthy system and amber LEDs indicating a service issue, such as a component failure. In some instances, LEDs illuminate in defined patterns that indicate a maintenance code. In addition to system-based LED indicators, individual components within server information handling system and rack also include LED indicators. For example, storage devices often flash an LED indicator when reading or writing information, power supplies often illuminate an LED indicator when power is applied, and communication devices often illuminate LED indicators when a network or other connection exists. Although LED indicators provide valuable information regarding the health of an information handling system, they also are a source of non-computing power consumption and heat creation that place a demand on the data center power and cooling resources.

SUMMARY OF THE INVENTION

Therefore a need has arisen for a system and method which manages server information handling system non-computing power consumption.

In accordance with the present invention, a system and method are provided which substantially reduce the disadvantages and problems associated with previous methods and systems for managing information handling system power consumption. Non-computing power consumption is centrally-managed with a data center administrative tool that provides indicator light configuration settings to support chassis and server information handling systems. The indicator light configuration settings override indicator light illumination at support chassis and information handling system components to reduce data center power consumption.

More specifically, a data center has plural support chassis, such as racks or blade chassis, that each holds plural server information handling systems in plural slots. A chassis management controller of each support chassis manages operation of server information handling systems disposed in each support chassis and components of the support chassis that support server information handling system operation, such as support chassis power supplies and input/output modules. A baseboard management controller of each server information handling system manages operation of components disposed the server information handling system to cooperate to process information. LED indicator lights disposed on components of the server information handling systems and support chassis illumination to visually indicate an operational status of the components, such as a green LED to confirm proper operation and an amber LED to alert of abnormal operation. A server light manager associated with the baseboard management controller of each server information handling system overrides indictor light illumination according to indicator light configuration settings received from a supporting chassis server light manager associated with the chassis management controller of the supporting chassis that holds the server information handling system. The indicator light configuration settings reduce energy consumed by indicator light illumination by overriding illumination unless predetermined conditions arise, such as opening of a support chassis bezel or interactions by an information technology administrator. Server light managers detect whether components have indicator light override capability by reference to an identifier in a field replaceable unit (FRU) and implement an update to the component if the capability is not present. Power saved by reducing indicator light illumination is allocated for use by server information handling systems.

The present invention provides a number of important technical advantages. One example of an important technical advantage is that server information handling system non-computing power consumption is managed to make better use of data center cooling and power resources. Although power consumption and heat dissipation associated with individual LEDs is negligible, the cumulative impact of multiple LEDs per server over multiple servers per rack and rows of racks can add considerable power consumption to a data centers total energy use. Data center wide LED illumination management provides power savings by reducing or eliminating unnecessary LED illumination, which in turn reduces power consumed by cooling resources that remove heat dissipated by the illumination of LEDs. A data center wide LED illumination management framework provides automated discovery and management at rack, blade, server and even component level so that LED illumination is limited to user-approved situations, such as when LEDs are both visible and presenting diagnostics information indicative of a requirement for service information technology administrator at the physical location of the LED. As one example, a data center having 1000 racks with 300 LEDs per rack saves over $100,000.00 per year in energy costs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system component indication lights are managed to selectively override illumination for power savings. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
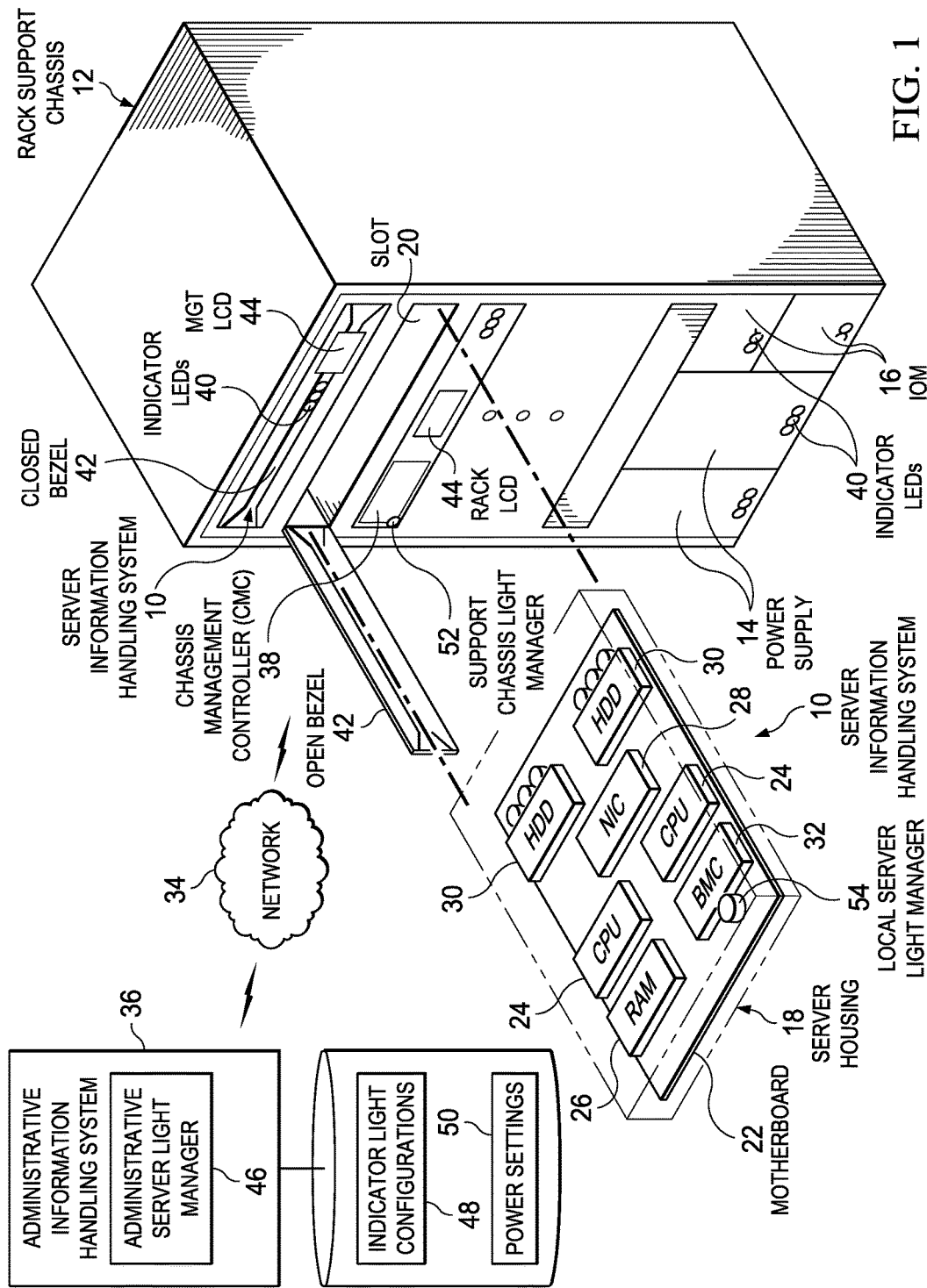
FIG. 1 depicts a block diagram of a system for server information handling system indication light management.

Referring now to FIG. 1, a block diagram depicts a system for server information handling system 10 indication light management. In the example embodiment, plural server information handling systems 10 are supported in a rack support chassis 12 that provides power from plural power supply units (PSUs) 14 and communications with plural input/output modules (IOMs) 16. Although the example embodiment depicts rack support chassis 12 with horizontally-stacked server information handling systems 10, alternative embodiments may use vertically-aligned server information handling systems supported in a blade support chassis or other type of support chassis. Server information handling systems 10 are deployed in server housings 18, sometimes referred to as sleds, that slide into and out of slots 20 of support chassis 12, such as with opposing sliding rails. Server housing 18 supports plural components of server information handling system 10 in a controlled environment within support chassis 12. For example, a motherboard 22 interfaces one or more processors, such as CPUs 24, with memory 26 that stores instructions and information for processing, such as serving requests received from clients through network interface cards (NICs) 28. Motherboard 22 includes interface support for other components deployed within a slot 20, such as hard disk drives (HDD) 30 or other non-volatile storage devices. The depicted example embodiment provides a simplified architecture of server information handling system 10 for illustrative purposes; those of skill in the art will recognize a variety of additional components that may be included in server information handling systems 10 and support chassis 12 to perform a variety of server functions.

During operation of server information handling system 10, a baseboard management controller (BMC) 32 manages operations of components within server housing 18. For example, BMC 32 provides remote power up and power down of CPUs 24 with commands provided through an out-of-band management network interface, as well as power management, such as allocation of power available to server information handling system 10. BMC 32 coordinates maintenance of components within server housing 18, such as by performing firmware updates and operating system patches. For example, BMC 32 of each server information handling system 10 interfaces through a network 34 to an administrative information handling system 36 to obtain management and maintenance settings. In addition, each BMC 32 interfaces with a chassis management controller (CMC) 38 to obtain chassis level management and maintenance settings. For example, CMC 38 receives power allocation for support chassis 12 from administrative information handling system 36 and then assigns each BMC 32 a portion of the allocated power for the BMC's associated information handling system. Across a data center, one or more administrative information handling systems 36 maintain power usage within data center resource restraints by allocating power to multiple support chassis 12, which in turn allocate power to multiple information handling systems 10. Other factors may also be considered in the allocation of power, including the priority of functions performed by various information handling systems 10, cooling restraints, and the demands for services distributed across information handling systems 10 of the data center.

One factor that increases power consumption in a data center is the illumination of indicator LEDs and management LCD panels that are included with support chassis 12, information handling systems 10 and components found in both support chassis 12 and information handling systems 10. In the example embodiment depicted by FIG. 1 indicator LEDs 40 are included at the outer surface of a closed bezel 42, within the interior of an information handling system 42, with an open bezel 42, at the outer surface of a CMC 38 panel, at support chassis 12 power supplies 14 and IOMs 16, and at components within information handling system 10, such as hard disk drives 30. In addition, management LCDs 44 are included at the exposed surface of a closed bezel 42 and support chassis 12 panel to provide interaction with BMC 32 and CMC 38 respectively. Although many management functions are performed in a data center with remote interactions by administrative information handling system 36, some "hands-on" management and maintenance functions require an information technology administrator to have physical access to an information handling system 10 or support chassis 12. LED indicators 40 and management LCDs 44 provide information technology administrators with local feedback at a server information handling system 10 that often aids in determining and resolving failures. For example, an administrator might receive an alert that a hard disk drive 40 within a server information handling system 10 needs replacement. An amber LED indicator 40 at a closed bezel 42 contrasted with green LED indicators at other closed bezels 42 will help the administrator find the server housing 18 to remove from the support chassis 12 to perform the maintenance. Once the administrator opens the bezel 42, hard disk drives 30 with green LED indicators 40 will contrast with a failed hard disk drive 30 having an amber LED indicator 40 so that the administrator knows which hard disk drive 30 to replace. In some instances, an administrator walking between support chassis 12 with a "trouble cart" will locate systems in need of maintenance by view amber LED indicators and debug the failure with a management LCD 44.

In order to reduce power consumption in the data center, administrative information handling system 36 executes an administrative server light manager 46 stored in non-transitory memory to distribute indicator light configurations 48 for use across plural support chassis 12 and server information handling systems 10 of a data center. For instance, the indicator light configurations 48 override component indicator light functionality so that only selected of indicator lights in a data center illuminate based upon selected conditions, thus reducing power consumption in the data center. Administrative server light manager 46 receives information from server information handling systems 10 and support chassis 12 that implement the indicator light configurations, and applies the power savings from reduced indicator light illumination to power settings 50 so that additional power made available by the changes to indicator light configurations may be allocated for computing-use functions, such as for use by server information handling systems 10. Administrative information handling system 36 distributes indicator light configurations 48 from administrative server light manager 46 to supporting chassis light managers 52 running from non-transitory memory of CMC 38 for application at each server information handling system 10 and for use at support chassis 12 components, such as power supplies 14 and IOMs 16. Supporting chassis light manager 52 in turn distributes indicator light configurations 48 to local server light managers 54 running from non-transitory memory of BMCs 32 for each server information handling system 10 disposed in supporting chassis 12.

In operation of one example embodiment, an administrator enters an indicator light configuration 48 at administrative server light manager 46 for distribution across data center that overrides green LED illumination at server information handling system 10 and support chassis 12 components. Support chassis light manager 52 and local server light manager 54 apply the indicator light configuration to override illumination of component LEDs unless a predetermined condition defined by the indicator light configurations is detected, such as detection of an amber LED illumination or opening of a bezel 42. Support chassis light manager 52 and local server light manager 54 each report statistics back to administrative server light manager 46 so that power savings may be computed and allocated to power settings 50. Once indicator configuration settings are enforced, green LEDs no longer illuminate in the data center, resulting in a reduction of non-computing power consumption and allocation of the saved power for use by server information handling systems. In various embodiments, various configuration settings may apply to illuminate all amber lights at an information handling system if a fault is detected so that the system is more easily found, to illuminate only failed device amber LEDs or to illuminate some green LEDs at a system that has a fault to help highlight the system. In one embodiment, indicator light configuration settings override illumination of all LEDs that are hidden from sight, such as at the rear of a support chassis or behind a bezel, and remove the override if the LEDs are brought into sight, such as at opening of a bezel or exposure of the rear of a support chassis. In the event that indicator light illumination is permitted at a server information handling system 10 or support chassis 12, local server light manager 54 and support chassis light manager 52 reports the illumination to administrative server light manager 46 so that adjustments to allocation of power at the data center may take place if needed.

Figures 2, 3:
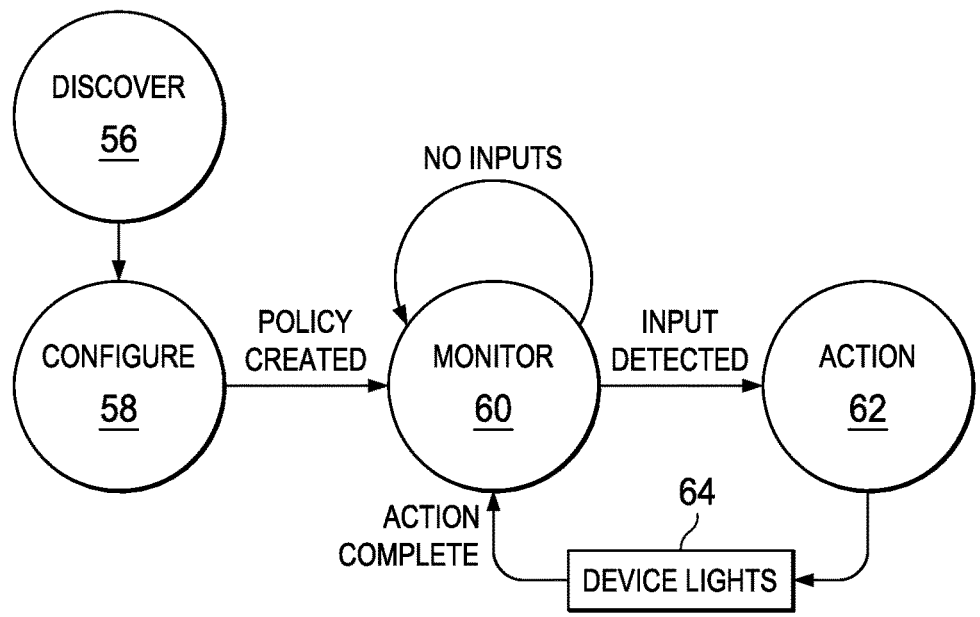
FIG. 2 depicts a state diagram of states of a local server light manager and support chassis light manager during management of indicator light illumination.
FIG. 3 depicts an example of a graphical user interface that creates an indicator light illumination policy.

Referring now to FIG. 2, a state diagram depicts states of a local server light manager and support chassis light manager during management of indicator light illumination. Server light management for components disposed in a data center is performed by a hardware and/or software module that executes instructions stored in non-transitory memory to discover, configure, monitor and act on server light illumination based upon inputs related to hardware events and health events associated with triggers for indication lights. An initial discovery state 56 discovers components having indicator lights subject to distributed control from management processors. The management processors, such as BMC and CMD, read system inventory, such as from a system BIOS, and collect non-computing power (NCP) values from each supported device. During discover state 56, management processors may detect components in a system inventory that lack remote indicator light illumination override control and may initiate firmware updates to the components to enable indicator light illumination override control. At configure state 58, user configuration states are accepted through graphical user interfaces that configure, select and create indicator light policies and profiles for systems located in the discover state. For example, FIG. 3 depicts a graphical user interface presented to a user for defining a policy of actions taken on a detected input. In the example policy configuration, the user defines inputs that initiate illumination (bezel position or server health state), the profile for the illumination (front, rear or custom defined positions), light illumination (off, on or blinking) and the color of the illumination (normal or amber). The user configurations are passed from an administrative server light manager through the support chassis light managers and local server light managers to individual components so that the components adapt indicator light illumination appropriately in response to predetermined inputs, such as by overriding illumination unless detection of a predetermined condition is provided to the components.

Once components are discovered and configured, and a policy created, the process continues to a monitor state 60 for monitoring of inputs at the chassis, server or component that has a policy applied. For example, monitoring is performed to determine if a bezel position change has occurred between open and closed positions, if a chassis cover position has changed between open and closed positions, if a server health condition has changed, etc. The monitor state continues until an input is detected, which results in transition to an action state 62. At action state 62, policies set on configuration are activated based upon associated inputs detected at the monitor state 60. For instance, the policy might turn off all LEDs of all components of a server information handling system and override the off if for components at the front of the server information handling system if the bezel state changes from closed to open. As another example, a support chassis policy might turn off all LEDs at support chassis power supplies and override the off if any server information handling system in the support chassis has a change in health state. The action state sets the appropriate device light setting at step 64 and then returns to monitor state 60. In the example embodiment, device lights at step 64 are set to have an illumination state that remains in force until the illumination setting is overridden by an indicator light manager.

Figure 4:
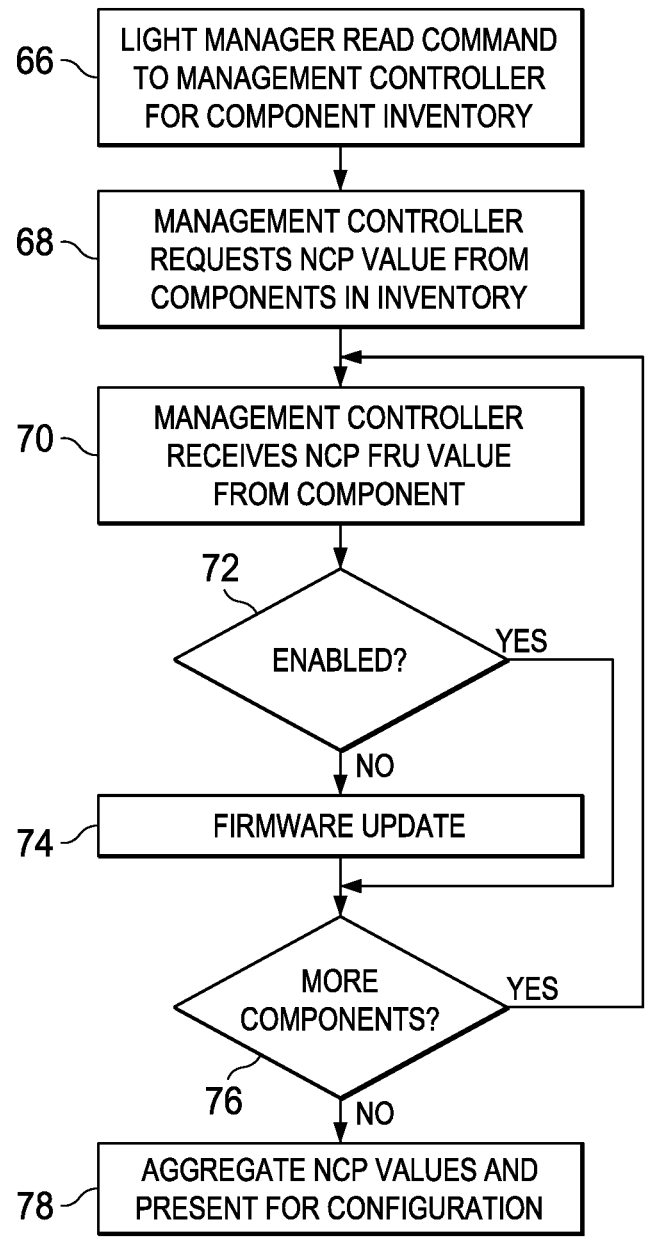
FIG. 4 depicts a flow diagram of a process for discovery of components for management of indicator lights.

Referring now to FIG. 4, a flow diagram depicts a process for discovery of components for management of indicator lights. The process starts at step 66 with a request by a light manager for the management controller to read a component inventory for discovery of components subject to indicator light control. For example, a BMC typically includes a list of hardware components of its supported server information handling system, such as in BIOS. As another example, a CMC typically interfaces with power supply units, cooling fans, IOMs and other support chassis components through a management link. At step 68, the management controller requests the NCP value from the components in the inventory. For example, the NCP value is stored in a field replaceable unit (FRU) of the component and includes information that defines the number, type, power consumption and illumination settings of LED indicators and management LCDs. In one embodiment, a CMC request for NCP values includes a request to each BMC in the support chassis for the NCP values of components disposed in each BMC's server information handling system. At step 70, the management controller receives NCP FRU values from each of the components in turn. At step 72, the management controller analyzes the FRU value received to determine if remote management of indicator lights is supported. If not, the process continues to step 74 to perform a firmware update of the component to enable remote indicator light management. If a component is enabled to perform remote indicator light management, the process continues to step 76 to determine if additional components exist to download. If so, the process returns to step 70 for the management controller to receive the next NCP value. If at step 76 all components are retrieved, the process continues to step 78 to aggregate the NCP values and present the values for configuration selection by the end user. Aggregation of the NCP values provides a power savings derived from configuration changes that the user may select so that the user understands how power consumption is reduced and how the saved power may be allocated to computing uses.

Figure 5:
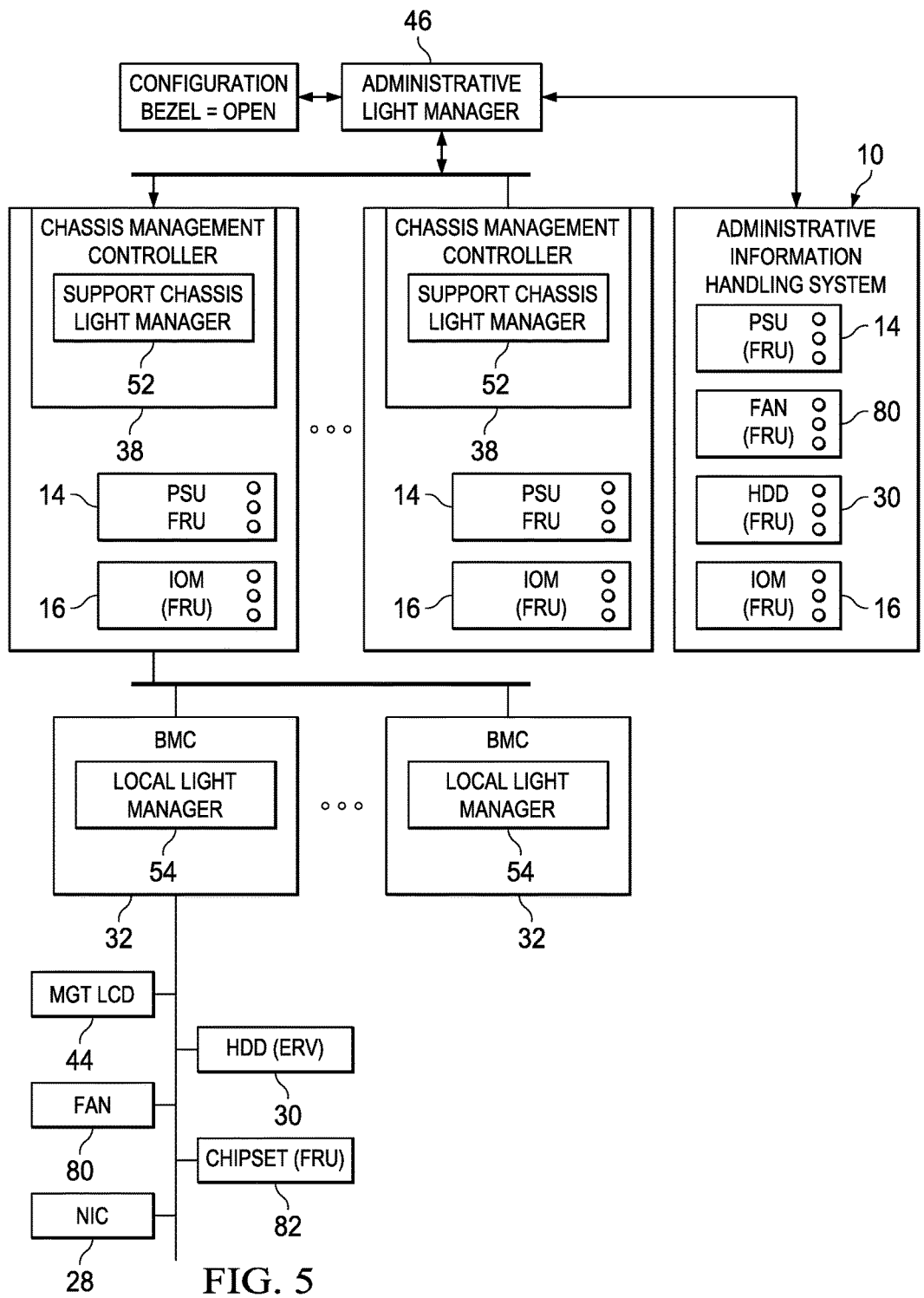
FIG. 5 depicts a block diagram of a process flow for communicating indicator light configuration settings through a data center.

Referring now to FIG. 5, a block diagram depicts a process flow for communicating indicator light configuration settings through a data center. In the example embodiment, a configuration setting is input at an administrator user interface to adapt indicator light illumination for a condition associated with a bezel position of open. The administrative light manager 46 accepts the configuration setting and applies the configuration setting to the administrative information handling system 10 components, such as a local power supply 14, cooling fan 80, hard disk drive 30 and IOM 16. For example, administrative light manager 46 retrieves NPC values stored in each FRU of each component to ensure that the components support indicator light management, and then sets each component to have a default value of indicator lights off and a bezel open value of amber indicator lights on for components that have a health alert. If administrative light manager 46 determines that a component lacks support for remote management of indicator lights, then administrative light manager 46 initiates an update for the firmware. Administrative light manager 46 then retrieves the indicator light configurations of the components in order to determine a power savings provide by the indicator light setting change.

In addition to configuring its local hardware components, administrative light manager 46 initiates configuration of components managed by CMCs and BMCs under its management. For example, administrative light manager 46 sends the bezel configuration setting to each CMC 38 under its management. Each CMC 38 has a support chassis light manager 52 that, in turn, applies the indicator light configuration settings to the components under the CMC's management, such as power supplies 14, IOMs 16 and server BMCs 32 for server information handling systems 10 deployed in the support chassis of the CMC 38. CMC 38 retrieves NCP values from the FRUs of support chassis components and initiates a firmware update if appropriate, and then provides the component indicator light configurations to the administrative light manager 46 for use in power allocation analysis. CMC 38 retrieves aggregated information collected from each BMC 32 for the BMC components and also forwards that aggregated information to administrative light manager 46. Each BMC 32 local light manager 54 in turn obtains indicator light configurations, sets the configuration setting provided from the CMC 38, and reports the configuration of the indicator light settings to the CMC 38 support chassis light manager for forwarding to administrative light manager 46.

During operation of the data center, administrative light manager 46 may remotely manage indicator light illumination at each component of the data center by passing the desired indicator light illumination as a setting. For example, administrative light manager 46 can establish a default setting in which each indicator light of the data center is turned off, but then reset the indicator light configuration settings to all on if an administrator is assigned to work on the system. The settings carried by an individual component may include a variety of conditions and sub-conditions that define when the indicator light illuminates. For instance, if a hard disk drive fails within a server information handling system 10, an amber LED might illuminate at the bezel of the server information handling system to indicate the failure while the hard disk drive failure LED will remain off. When the BMC 32 of the server information handling system 10 detects that its bezel 42 has unlocked or opened, the local server light manager associated with the BMC 32 overrides the hard disk drive LED off setting to illuminate an amber LED indicator light at the failed hard disk drive. Upon overriding the hard disk drive indicator light setting, the local server light manager 54 issues a change in status of the indicator light illumination to the BMC and in turn to the CMC so that changes in power allocation associated with indicator light illumination may be initiated. By incrementally overriding illumination settings for indicator lights that are hidden from sight based upon access made to physical components, power consumption is reduced without impacting the usefulness of indicator LED illumination to administrators in the data center. As an example, indicator light settings based upon the location of a component (external, internal, front, rear, etc.) provide a basis for minimizing illumination of LEDs that are hidden from sight.

Figure 6:
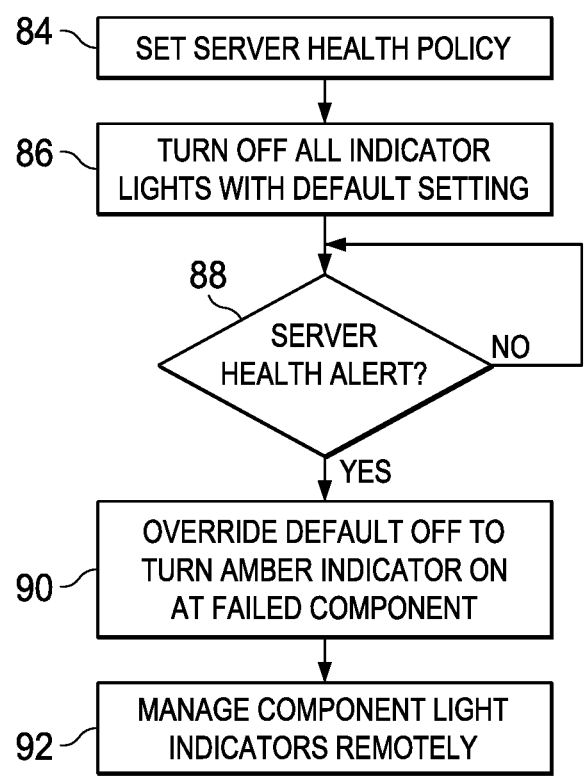
FIG. 6 depicts a flow diagram of a process for acting on a light indicator condition to override a component light indication.

Referring now to FIG. 6, a flow diagram depicts a process for acting on a light indicator condition to override a component light indication. The process begins at step 84 by setting server information handling system health policy, such as indicator light illumination settings that define illumination of component LED indicators based upon health alerts for the components in the server information handling system. At step 86, all indicator lights of the server information handling system are turned off with a default setting. At step 88, a determination is made of whether the server information handling system has issued an alert, such as failed or malfunctioning component detection. If not, monitoring continues at step 88 until a failure is detected or the configuration setting is changed. If server information handling system health alert is detected, the process continues to step 90 to override the default off component indicator light illumination setting for the failed component. Overriding the default off setting for the component allows the component to illuminate its LED indicators per the component's inherent indicator settings or according to another configuration setting for the indicator lights. At step 92, the indicator LED illuminates at the component according to the next configuration setting or according to a remote configuration setting sent from an administrator. Configuration settings for indicator lights may include different colors, flashing or other factors as desired to highlight the component and detected failure. In one embodiment, the indicator light configuration settings may turn on just a management LCD at a system bezel that provides user control of component indicator lights within the system.

Although the present invention has been described in detail, it should be understood that various changes, substitutions and alterations can be made hereto without departing from the spirit and scope of the invention as defined by the appended claims.

What is claimed is:

1. A method for managing information handling system indicator light illumination, the method comprising:
  retrieving indicator light configuration information from plural components of an information handling system to a management controller;
  altering the indicator light operation from the configuration information in accordance with a first indicator light setting of the management controller;
  detecting a predetermined condition;
  in response to the predetermined condition, altering the indicator light operation from that of the first indicator light setting to a second indicator light setting of the management controller;
  wherein retrieving indicator light configuration information further comprises retrieving an identifier stored in a field replaceable unit (FRU), the method further comprising:
  detecting from the identifier that one or more of the plural components does not support altering the indicator light operation; and
  in response to detecting, performing a firmware update of the one or more of the plural components to add support for altering the indicator light operation.

2. A method for managing information handling system indicator light illumination, the method comprising:
  retrieving indicator light configuration information from plural components of an information handling system to a management controller;
  altering the indicator light operation from the configuration information in accordance with a first indicator light setting of the management controller;
  detecting a first predetermined condition;
  in response to the first predetermined condition, altering the indicator light operation from that of the first indicator light setting to a second indicator light setting of the management controller;
  retrieving the indicator light configuration information from the management controller to a chassis management controller of a supporting chassis that supports the information handling system;
  retrieving indicator light configuration information from plural supporting chassis components to the chassis management controller; and altering the chassis components indicator light operation from that of the configuration information in accordance with a first indicator light setting of the chassis management controller;

detecting a predetermined second condition; and in response to the second predetermined condition, altering the chassis components indicator light operation from that of the first indicator light setting to a second indicator light setting of the chassis management controller.

3. The method of claim 2 further comprising:

determining at the chassis management controller a power allocation associated with the first indicator light setting of the management controller and the chassis controller; and increasing power allocated to one or more information handling systems disposed in the supporting chassis by the determined power allocation.

4. The method of claim 3 further comprising:

in response to the second predetermined condition, decreasing power allocated to the one or more information handling systems to a power allocation associated with the second indicator light setting of the management controller and the chassis controller; and in response to decreasing power allocated, performing the altering the indicator light operations.

5. The method of claim 2 wherein:

the first indicator light setting of the management controller comprises turning off a hard disk drive LED indicator; and the first indicator light setting of the chassis management controller comprises turning off a power supply LED indicator.

6. The method of claim 2 wherein:

the first indicator light setting of the management controller comprises turning off a power LED indicator; and the first indicator light setting of the chassis management controller comprises turning off an input/output module LED indicator.

7. The method of claim 1 wherein the predetermined condition comprises opening of a bezel to access the information handling system.

8. An information handling system comprising:

a chassis operable to support plural sleds;

a sled disposed in the chassis;

a processor disposed in the sled and operable to execute instructions that process information;

memory disposed in the sled and interfaced with the processor, the memory operable to store the instructions and memory;

plural components disposed in the sled and operable to support information processing, the plural components having one or more indication lights that illuminate to indicate an operational status;

a management processor disposed in the sled and interfaced with the processor, memory and plural components, the management processor operable to manage power applied to the processor and to communicate with the plural components; and a local server light manager stored in non-volatile memory and operable to execute on the management processor, the local server light manager interfacing with the plural components to manage illumination of the indication lights according to at least first and second configuration settings defined by a chassis management controller associated with the chassis and communicated to the management processor;

wherein:

the plural components include a field replaceable unit (FRU) storing an identifier associated with support for interaction with the local server light manager; and the local server light manager is further operable to coordinate a firmware update for one or more of the plural components if the FRU of the one or more of the plural components does not have the identifier associated with support for interaction with the local server manager.

9. The server information handling system of claim 8 further comprising:

a bezel operable to move between a closed position covering at least some of the plural component indication lights and an open position exposing the at least some of the plural component indication lights;

wherein the first configuration setting comprises all indication lights off with the bezel closed and only amber indication lights associated with faults illuminated with the bezel open.

* * * * *